United States Patent Office 3,472,875
Patented Oct. 14, 1969

3,472,875
PROCESS FOR PURIFYING CRUDE 3,4 - DICAR-BOXY - 1,2,3,4 - TETRAHYDRO - 1 - NAPHTHALENE SUCCINIC DIANHYDRIDE COMPRISING RECRYSTALLIZING SAID DIANHYDRIDE FROM AN ACETONITRILE SOLUTION
Roland Ralph Di Leone, Rowayton, Conn., assignor to American Cyanamid Company, Stamford, Conn., a corporation of Maine
No Drawing. Continuation-in-part of application Ser. No. 589,521, Oct. 26, 1966. This application Apr. 20, 1967, Ser. No. 632,221
Int. Cl. C07d 5/40
U.S. Cl. 260—346.3                        6 Claims

ABSTRACT OF THE DISCLOSURE

A process for purifying crude 3,4-dicarboxy-1,2,3,4-tetrahydro-1-naphthalene succinic dianhydride comprising introducing said dianhydride into acetonitrile in an amount calculated to provide a saturated solution of said dianhydride in acetonitrile at the boiling point of said acetonitrile, heating said mixture to the boiling point of the mixture so as to achieve a true solution, cooling said solution down to at least room temperature thereby recrystallizing said dianhydride in substantially pure form and retrieving it from the solvent medium.

CROSS-REFERENCE TO RELATED APPLICATIONS

This application is a continuation-in-part of my earlier application Ser. No. 589,521, filed Oct. 26, 1966. Still further, the earlier application is a continuation-in-part of my copending application Ser. No. 266,081, filed Mar. 18, 1963, now abandoned. Still further my application Ser. No. 575,240 filed Aug. 26, 1966, is a continuation-in-part of my earlier application having the Ser. No. 266,081 filed Mar. 18, 1963, now abandoned. Said Ser. No. 575,240 is now U.S. Patent 3,410,876 issued Nov. 12, 1968. Still further, said earlier application is a continuation-in-part of my copending application Ser. No. 478,739, filed Aug. 10, 1965, now abandoned. Still further, that application is a continuation-in-part of my copending application Ser. No. 484,725, filed Sept. 2, 1965, now abandoned. This latter application having the Ser. No. 484,725 is, in turn, a continuation-in-part of my earlier application having the Ser. No. 442,209, filed Mar. 23, 1965, now abandoned.

BACKGROUND OF THE INVENTION

The compound, 3,4 - dicarboxy - 1,2,3,4 - tetrahydro - 1-naphthalene succinic dianhydride, is referred to sometimes hereinbelow as tetralin dianhydride for the sake of simplicity and sometimes by the symbol "TDA" for the sake of brevity. This dianhydride has been found to be particularly useful in making polyimides by reacting said dianhydride with an organic diamine and, preferably, an aromatic diamine. The dianhydride which is purified in keeping with the process of the present invention is prepared by reacting styrene and maleic anhydride in an atmosphere of nitric oxide wherein the mole ratio of styrene to maleic anhydride is about 1:2, respectively. In the course of the manufacture of the TDA, certain impurities are developed which register their presence by displaying a slightly yellowish appearance to the TDA as a result of the presence of color bodies which may be due to the use of the nitric oxide in the production of TDA. It is further speculated that the almost unavoidable presence of exceedingly small quantities of moisture may result in the conversion of one or more of the anhydride groups in the dianhydride to the monoanhydride dicarboxylic acid and to the tetracarboxylic acid in a limited number of molecules in the total composition. If this crude material is not sufficiently purified before reaction with the organic dianhydride to produce the polyimides, the resultant polyimide will have a lower molecular weight, and inferior physical or chemical properties, compared with polyimide made from a pure TDA such as that provided by the present invention.

FIELD OF THE INVENTION

This invention is in the field of the purification of crude DTA to produce a substantially pure TDA essentially free from color body impurities and essentially free from tetracarboxylic acids and dicarboxylic acid monoanhydride.

DESCRIPTION OF THE PRIOR ART

The applicant is not aware of any prior art which shows the purification of crude TDA by recrystallization from acetonitrile.

SUMMARY OF THE INVENTION

This invention relates to a process for purifying crude 3,4-dicarboxy-1,2,3,4-tetrahydro - 1 - naphthalene succinic dianhydride comprising introducing said dianhydride into acetonitrile in an amount calculated to provide a saturated solution of said dianhydride in acetonitrile at the boiling point of said acetonitrile, heating said mixture to the boiling point of the mixture so as to achieve a true solution, cooling said solution down to at least room temperature thereby recrystallizing said dianhydride in substantially pure form and retrieving it from the solvent medium. Still further, this invention relates to the process as outlined hereinabove in which small quantities of a liquid anhydride of an aliphatic monocarboxylic acid are added to the acetonitrile. Still further, this invention relates to the process as outlined hereinabove in which a non-solvent is added to the solution of said dianhydride before cooling the solution to room temperature.

The principal object of the present invention is to purify crude tetralin dianhydride by preparing a saturated solution of said dianhydride in acetonitrile at the boiling point of said acetonitrile solution and, thereafter, cooling the solution down to at least room temperature and, preferably, below. A further object of the present invention is to increase the yield of TDA upon recrystallization from about 55% to about at least 72%. A further object of the present invention is to reduce processing costs. These and other objects of the present invention will be discussed in greater detail hereinbelow.

In my earlier application referred to hereinabove and having the Ser. No. 266,081, filed Mar. 18, 1963, and, now abandoned, I have shown the method for the preparation of tetralin dianhydride. For the sake of completeness, the method of such preparation is set forth hereinbelow.

PROCESS FOR THE PREPARATION OF 3,4-DICARBOXY - 1,2,3,4 - TETRAHYDRO - 1 - NAPHTHALENE SUCCINIC DIANHYDRIDE

Into a suitable reaction vessel equipped with stirrer, thermometer, reflux condenser, gas inlet and outlet tubes there is introduced 216 parts of maleic anhydride. The charge is heated on a steam bath until the maleic anhydride melts. Thereupon the system is flushed with nitric oxide. After thoroughly saturating the system with nitric oxide (in about 10 minutes), 104 parts of monomeric styrene is added and the reaction mixture is heated on a steam bath at a temperature between about 90–95° C. After about 2 hours of heating, a crystalline product starts to precipitate out of solution. The reaction is continued for an additional 6 hour period after which time 800 parts of a 5:1 toluene-acetone mixture is added. The product is slurried in the solvent mixture for about 15 minutes at the steam bath temperature (90–95° C.) and is then collected by suction filtration. The product had a melting point of 197–198° C. and showed the following analysis:

Calculated for $C_{16}H_{12}O_6$: C, 64.00; H, 4.00. Found: C, 63.41; H, 4.29.

The product is a white solid which is soluble in acetone and when recrystallized from an acetone solution the product is white and has a melting point of about 202–3° C. and is in the form of needles or prisms.

In practicing the process of the present invention, a quantity of crude tetralin dianhydride is introduced into a quantity of acetonitrile in an amount calculated to provide a saturated solution of said dianhydride in acetonitrile at the boiling point of said acetonitrile. This is preferably accomplished at room temperature and will generally amount to a precalculated 40% solids of TDA in acetonitrile. Since the TDA dissolves to a limited extent, namely, about 15% in acetonitrile at room temperature, the excess 25% at room temperature is in an undissolved state. However, upon heating the mixture to the boiling point (reflux of the mixture), the remaining 25% becomes dissolved in the acetonitrile to produce a substantially true solution in a relatively short period of time. It is preferred that the acetonitrile be substantially anhydrous although this ideal condition seldom exists since the acetonitrile may contain traces of moisture such as about $\frac{1}{10}$ of 1%, by weight, based on the weight of the acetonitrile. After the saturated solution of tetralin dianhydride in acetonitrile has been accomplished by heating at reflux, the solution is cooled to at least room temperature and, preferably, to temperatures around 0° C. or even at temperatures below 0° C. such as those approaching the melting-freezing point of acetonitrile, namely, −44° C. As the super-saturated solution dips significantly below the boiling point of the solution, precipitation of the purified TDA begins and continues as the cooling develops. When the desired end point has been reached, the precipitated crystals can readily be filtered off and washed in toluene, or the like, and dried. Although for practical purposes, one would conduct the heating of the mixture of the TDA and the acetonitrile to its boiling point at atmospheric pressure, both subatmospheric and superatmospheric pressures may be used.

As one of the preferred embodiments of the process of the present invention, one may add small quantities of a liquid anhydride of an aliphatic monocarboxylic acid to the acetonitrile. The amount of this liquid anhydride of an aliphatic monocarboxylic acid which may be added can be varied between about 0% and 10% and, preferably, from about 4%, by weight, to about 6%, by weight, based on the total weight of the acetonitrile and crude TDA. The addition of this liquid anhydride to the acetonitrile can be accomplished before the TDA is added or after, or it can be added simultaneously with the TDA. The purpose in adding the liquid anhydride is to provide a material which will absorb the traces of water that may be present in the acetonitrile and also for the purpose of dehydrating any of the carboxylic acid group pairs that may exist in the tetracarboxylic acid form of tetralin dianhydride or the dicarboxylic acid monoanhydride form of tetralin dianhydride. Among the liquid anhydrides of aliphatic monocarboxylic acids which may be added to the acetonitrile are acetic anhydride, propionic anhydride, butyric anhydride, 2-methylpropionic anhydride, valeric anhydride, 2-methylbutyric anhydride, 3-methylbutyric anhydride, and the like. These anhydrides may be used either singly or in combination with one another.

A further preferred embodiment of the process of the present invention is to utilize a non-solvent for said dianhydride which is added to the acetonitrile solution or dispersion so as to reduce the viscosity of the slurry as it is being cooled down and as the crystalline tetralin dianhydride begins to precipitate out. When the saturated solution of the TDA in the acetonitrile at the boiling point begins to cool, the precipitation of the TDA purified crystals begins and accelerates as the temperature of the fluid drops. When the temperature drops significantly below room temperature such as down to 0° C., a very substantial amount of the TDA is precipitated and results in a slurry of the undissolved TDA in the acetonitrile, which slurry is not readily pumpable or handleable. Among the non-solvents which may be used in this connection are the aromatic hydrocarbon solvents such as benzene, toluene, xylene, and the like. These aromatic organic solvents do not dissolve the tetralin dianhydride and, therefore, with respect thereto they must be considered non-solvents for the tetralin dianhydride and are at the same time inert to each of the tetralin dianhydride and the acetonitrile. These non-solvents can obviously be used either singly or in combination with one another as a preferred optional step in the process of the present invention. These non-solvents may be used in the practice of the process of the present invention whether or not a liquid anhydride of an aliphatic monocarboxylic acid is added to the acetonitrile. The amount of non-solvent which may be used is strictly a matter of choice and may vary from 0% on up to very substantial quantities, but as soon as the amount added renders the slurry of tetralin dianhydride in the acetonitrile/non-solvent mix pumpable and handleable, nothing of consequence is to be gained by using any excess of the non-solvent. It should be observed here that the acetonitrile and these aromatic hydrocarbons are miscible with one another, that is, they are blendable with one another in all proportions to form true solutions of one in the other.

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the case.

EXAMPLE 1

Into a suitable reaction vessel equipped with thermometer, stirrer, and reflux condenser, there is introduced 150 parts of acetonitrile followed by 6 parts of acetic anhydride and then 100 parts of crude tetralin dianhydride. The mixture is heated gradually to the reflux temperature with constant stirring until a true solution is achieved. This takes approximately 10 minutes. At this point, 150 parts of toluene is charged and the mixture is brought back to reflux and held at reflux for about ½ hour. The charge is then filtered and cooled to 3° C. with stirring. At this point, the product is collected, washed with toluene and dried to give a yield of 72 parts (72%). The product has a capillary melting point of 202–204° C. The crude material used as the starting material had a capillary melting point of 182–197° C. The crude material, furthermore, had a percentage of TDA via anhydride analysis of 93.9%, whereas the substantially pure material produced in the aforesaid example had a TDA percentage via anhydride analysis of 97.2%.

EXAMPLE 2

Example 1 is repeated in all essential details except that in the place of the 6 parts of acetic anhydride there is utilized 6 parts of propionic anhydride. A yield of 71% of purified TDA is obtained having a melting point of 202–203° C.

EXAMPLE 3

Example 1 is repeated in all essential details except that the acetic anhydride is eliminated. A yield of about 70% of TDA is obtained having a melting point of 202–204° C.

EXAMPLE 4

Example 1 is repeated in all essential details except that no non-solvent for the TDA is utilized. A yield of 70% purified TDA is obtained having a melting point of 202–204° C.

EXAMPLE 5

Example 1 is repeated in all essential details except that both the toluene and the acetic anhydride are eliminated. A yield of 68% TDA is obtained having a melting point of 202-204° C.

I claim:

1. A process for purifying crude 3,4-dicarboxy-1,2,3,4-tetrahydro-1-naphthalene succinic dianhydride comprising introducing said dianhydride into acetonitrile in an amount calculated to provide a saturated solution of said dianhydride in acetonitrile at the boiling point of said acetonitrile, heating said mixture to the boiling point of the mixture so as to achieve a true solution, cooling said solution down to at least room temperature thereby recrystallizing said dianhydride in substantially pure form and retrieving it from the solvent medium.

2. The process according to claim 1 in which small quantities up to about 10% by weight based on the weight of said dianhydride of a liquid anhydride of an aliphatic monocarboxylic acid are added to the acetonitrile.

3. A process according to claim 1 in which a non-solvent for said dianhydride is added to the solution before cooling to room temperature.

4. A process according to claim 1 in which a non-solvent for said dianhydride is added to the solution before cooling to room temperature and in which small quantities up to about 10% by weight based on the weight of said dianhydride of a liquid anhydride of an aliphatic monocarboxylic acid are added to the acetonitrile.

5. The process according to claim 1 in which small quantities up to about 10% by weight based on the weight of said dianhydride of acetic anhydride are added to the acetonitrile.

6. A process according to claim 1 in which a non-solvent for said dianhydride is added to the solution before cooling to room temperature and in which small quantities up to about 10% by weight based on the weight of said dianhydride of acetic anhydride are added to the acetonitrile.

References Cited

Vogel, Arthur I.: Practical Organic Chemistry, John Wiley & Sons, New York, N.Y. (1957) pp. 122-125.

Veatch et al.: Hydrocarbon Processing and Petroleum Refiners, vol. 43, No. 1 (April 1964) pp. 181—183.

Jenner-Manufacturing Chemist and Aerosol News, March 1965, pp. 53-54.

ALEX MAZEL, Primary Examiner

B. I. DENTZ, Assistant Examiner

U.S. Cl. X.R.

260—78